US011224017B2

(12) United States Patent
Marinier et al.

(10) Patent No.: US 11,224,017 B2
(45) Date of Patent: Jan. 11, 2022

(54) METHOD AND APPARATUS FOR OPERATING IN A DISCONTINUOUS RECEPTION MODE EMPLOYING CARRIER AGGREGATION

(71) Applicant: InterDigital Patent Holdings, Inc., Wilmington, DE (US)

(72) Inventors: Paul Marinier, Brossard (CA); Stephen E. Terry, Northport, NY (US); Jean-Louis Gauvreau, La Prairie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/238,341

(22) Filed: Jan. 2, 2019

(65) Prior Publication Data

US 2019/0141634 A1 May 9, 2019

Related U.S. Application Data

(63) Continuation of application No. 15/435,943, filed on Feb. 17, 2017, now Pat. No. 10,172,087, which is a
(Continued)

(51) Int. Cl.
*H04W 52/02* (2009.01)
*H04L 5/00* (2006.01)
(Continued)

(52) U.S. Cl.
CPC ......... *H04W 52/0241* (2013.01); *H04L 5/001* (2013.01); *H04L 5/0098* (2013.01);
(Continued)

(58) Field of Classification Search
None
See application file for complete search history.

(56) References Cited

U.S. PATENT DOCUMENTS 7,631,247 B2 12/2009 Petrovic et al.
7,680,058 B2 3/2010 Seurre et al.
(Continued)

FOREIGN PATENT DOCUMENTS

CN 101478379 7/2009
EP 1986458 10/2008
(Continued)

OTHER PUBLICATIONS

3GPP TSG-RAN1 #56bis R1-091503: Anchor component carrier and preferred control signal structure, dated Jan. 2009, all pages. (Year: 2009).*
(Continued)

*Primary Examiner* — Gregory B Sefcheck
*Assistant Examiner* — Srinivasa R Reddivalam
(74) *Attorney, Agent, or Firm* — Volpe Koenig

(57) ABSTRACT

Methods and apparatus are described. A long term evolution-advanced (LTE-A) wireless transmit/receive unit (WTRU) includes a transceiver and a processor. The transceiver receives discontinuous reception (DRX) configuration information. The processor, in response to the received DRX information, controls the transceiver to monitor LTE-A physical downlink control channels (PDCCHs) in subframes in a first frequency band during an active time. The processor further, in response to detecting a downlink assignment in an LTE-A PDCCH in the first frequency band during the active time, wherein the downlink assignment indicates a second frequency band and assigned subcarriers within the second frequency band, to receive an LTE-A physical downlink shared channel (PDSCH) K subframes after a transmission of the downlink assignment. The second frequency band is different than the first frequency band.

9 Claims, 4 Drawing Sheets

Related U.S. Application Data continuation of application No. 12/817,479, filed on Jun. 17, 2010, now abandoned.

(60) Provisional application No. 61/233,641, filed on Aug. 13, 2009, provisional application No. 61/218,172, filed on Jun. 18, 2009.

(51) Int. Cl.
*H04W 76/28* (2018.01)
*H04W 72/04* (2009.01)

(52) U.S. Cl.
CPC ..... *H04W 72/042* (2013.01); *H04W 72/0453* (2013.01); *H04W 76/28* (2018.02); *H04L 5/0055* (2013.01); *Y02D 30/70* (2020.08)

(56) References Cited

U.S. PATENT DOCUMENTS

| | | | |
|---|---|---|---|
| 8,094,595 B2 | 1/2012 | Montojo et al. | |
| 8,311,053 B2 * | 11/2012 | Choi | H04W 52/54 370/442 |
| 2005/0277419 A1 * | 12/2005 | Takano | H04W 52/48 455/442 |
| 2009/0034452 A1 | 2/2009 | Somasundaram et al. | |
| 2009/0150739 A1 | 6/2009 | Park et al. | |
| 2009/0268685 A1 * | 10/2009 | Chen | H04L 5/0053 370/329 |
| 2009/0316638 A1 | 12/2009 | Yi et al. | |
| 2010/0195586 A1 * | 8/2010 | Choi | H04W 72/042 370/329 |
| 2010/0210256 A1 * | 8/2010 | Shen | H04L 1/1692 455/422.1 |
| 2010/0232373 A1 * | 9/2010 | Nory | H04W 72/1289 370/329 |
| 2010/0296389 A1 | 11/2010 | Khandekar et al. | |
| 2010/0322158 A1 | 12/2010 | Lee | |
| 2011/0267957 A1 * | 11/2011 | Du | H04L 5/0053 370/241 |
| 2011/0310997 A1 | 12/2011 | Ke et al. | |
| 2013/0010619 A1 | 1/2013 | Fong | |
| 2015/0092723 A1 * | 4/2015 | Ahn | H04L 1/1607 370/329 |

FOREIGN PATENT DOCUMENTS

| | | |
|---|---|---|
| EP | 2028903 | 2/2009 |
| JP | 2009-077288 | 4/2009 |
| WO | 08/114977 | 9/2008 |
| WO | 08/134614 | 11/2008 |
| WO | 08/132685 | 12/2008 |
| WO | 2009022826 A1 | 2/2009 |
| WO | 09/038367 | 3/2009 |
| WO | 10/008837 | 1/2010 |
| WO | 2010/048142 A1 | 4/2010 |
| WO | 2010/051209 A1 | 5/2010 |
| WO | 10/075709 | 7/2010 |

OTHER PUBLICATIONS

Asustek, "Discussion on DRX cycle," 3GPP TSG-RAN2 Meeting #61 bis, R2-081680, Shenzhen, China, (Mar. 31-Apr. 4, 2008).
Catt, "Consideration on DRX," 3GPP TSG RAN WG2 Meeting #66, R2-092992, San Francisco, USA (May 4-8, 2009).
Catt, "Consideration on DRX," 3GPP TSG RAN WG2 Meeting #66bis, R2-093725 (Jun. 29-Jul. 3, 2009).
Ericsson, "Carrier aggregation in LTE-Advanced," TSG-RAN WG1 #53bis, R1-082468 (Jun. 30-Jul. 4, 2008).
Ericsson, "DRX with Carrier Aggregation in LTE-Advanced," 3GPP TSG-RAN WG2 #66, R2-092959 (May 4-8, 2009).
Fujitsu, "Anchor component carrier and preferred control signal structure," 3GPP TSG-RAN1 #56bis, R1-091503 (Jan. 23-27, 2009).
Fujitsu, "DL control channel structure (PDCCH to PDSCH)," 3GPP TSG-RAN1 #55, R1-084300 (Nov. 10-14, 2008).
Huawei, "Carrier Aggregation in Active Mode," 3GPP TSG-RAN WG2 Meeting #66, R2-093104, San Francisco, USA (May 4-8, 2009).
Interdigital, "CQI Reporting and PDCCH Reception During DRX," 3GPP TSG RAN WG2 #63, R2-084080 (Aug. 2008).
LG Electronics, "HARQ process mapping across aggregated component carriers," 3GPP TSG RAN WG1 #57, R1-092125 (May 4-8, 2009).
LG Electronics, Inc., "DRX inactivity Timer," 3GPP TSG-RAN WG2 #65bis, R2-092068, Seoul, South Korea (Mar. 23-27, 2009).
NTT Docomo, "Definition of Non DRX/DRX state in TS 36.133," TSG-RAN Working Group 4 Meeting #49bis, R4-090063, Ljubljana, Slovenia (Jan. 12-16, 2009).
NTT Docomo, "Further considerations on DRX state in TS 36.133," TSG-RAN Working Group 4 Meeting #50, R4-090740, Athens, Greece (Feb. 9-13, 2009).
Philips, "PDCCH for Carrier Aggregation," 3GPP TSG RAN WG1 Meeting #57, Tdoc R1-092034 (May 4-8, 2009).
Qualcomm Europe, "DC-HSDPA and CPC," 3GPP TSG-RAN WG1 #54, R2-084409, Jeju, Korea (Aug. 18-22, 2008).
Research in Motion UK Limited, "DRX Operation for Carrier Aggregation," 3GPP TSG RAN WG2 Meeting #66b, R2-093732 (Jun. 29-Jul. 3, 2009).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.3.0, (Sep. 2008).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.6.0, (Jun. 2009).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.5.0, (Mar. 2009).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.8.0, (Dec. 2009).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V9.2.0, (Mar. 2010).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.5.1 (Mar. 2009).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.3.0 (Mar. 2010).
Third Generation Partnership Project, "Technical Specification Group Radio Access Network; Evolved Universal Terrestrial Radio Access (E-UTRA); Physical layer procedures (Release 8)," 3GPP TS 36.213 V8.7.0 (May 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.2.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.8.0 (Mar. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.3.0 (Mar. 2010).
Third Generation Partnership Project, "Technical Specification Group Radio Access Network; Evolved Universal Terrestrial Radio Access

(56) References Cited

OTHER PUBLICATIONS (E-UTRA) Radio Resouce Control (RRC); Protocol specification (Release 8)," 3GPP TS 36.331 V8.5.0 (Mar. 2009).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.2.0 (Mar. 2010).
Third Generation Partnership Project, "Technical Specification Group Radio Access Network; Evolved Universal Terrestrial Radio Access (E-UTRA); Physical Channels and Modulation (Release 8)," 3GPP TS 369.211 V8.7.0 (May 2009).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).
Third Generation Partnership Project, "Technical Specification Group Radio Access Network; Evolved Universal Terrestrial Radio Access (E-UTRA); Multiplexing and channel codeing (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.2.0 (Jun. 2010).

\* cited by examiner

METHOD AND APPARATUS FOR OPERATING IN A DISCONTINUOUS RECEPTION MODE EMPLOYING CARRIER AGGREGATION

CROSS REFERENCE TO RELATED APPLICATIONS

This application is a continuation of U.S. patent application Ser. No. 15/435,943, filed Feb. 17, 2017, which issued as U.S. Pat. No. 10,172,087 on Jan. 1, 2019, which is a continuation of U.S. patent application Ser. No. 12/817,479, filed Jun. 17, 2010, which claims the benefit of U.S. Provisional Application Nos. 61/218,172, filed Jun. 18, 2009, and 61/233,641, filed Aug. 13, 2009, which are incorporated by reference as if fully set forth herein.

TECHNICAL FIELD

This application is related to wireless communications.

BACKGROUND

Discontinuous reception (DRX) operation in a release 8 (R8) long term evolution (LTE) system is defined by the medium access control (MAC) third generation partnership project (3GPP) specification. This functionality consists of a set of rules that define when, (i.e., in which subframes), a network (i.e., an evolved Node-B (eNB)) may send control information consisting of downlink (DL) assignments and/or uplink (UL) grants (i.e., shared channel dynamic allocations) to a wireless transmit/receive unit (WTRU) using a physical DL control channel (PDCCH). The eNB DL assignments and/or UL grants, received by the WTRU on the PDCCH, signal to the WTRU the existence of DL and/or UL shared channel transmission opportunities. The period of time during which the WTRU monitors the PDCCH for this control information is referred to as the "active time". The WTRU may turn off its receiver circuitry on a condition that the PDCCH and other DL physical channels need not be monitored, thus resulting in battery savings.

In order to further improve achievable throughput and coverage of LTE-based radio access systems, and in order to meet the international mobile telecommunications (IMT)-advanced requirements of 1 Gbps and 500 Mbps in the DL and UL directions, respectively, LTE-advanced (LTE-A) is currently under study in the 3GPP standardization body. One improvement proposed for LTE-A is carrier aggregation and support of a flexible bandwidth arrangement in order to allow DL and UL transmission bandwidths to exceed 20 MHz in R8 LTE, (e.g., 40-100 MHz).

To support carrier aggregation, it has been proposed that control information carrying a DL assignment pertaining to a given component carrier (CC), (over PDCCH), be transmitted over a different DL CC than the one that contains the data, (e.g., the physical DL shared channel (PDSCH)). Such an arrangement may be advantageous to the system operator for allowing flexibility in the configuration of control channels and thus maximizing capacity. For instance, it allows the transmission of all PDCCHs from a single CC.

In R8, a time relationship is established based on PDSCH data being immediately transmitted in a subframe (i.e., transmission timing interval (TTI)) of a radio frame after a PDCCH containing a corresponding DL assignment is transmitted in the same subframe. It would be beneficial to maintain this time relationship for the scenario where PDSCH data and a corresponding PDCCH DL assignment are transmitted on different CCs. However, this scenario potentially requires a higher battery consumption, since two CCs, (the one containing a PDCCH and the one containing a PDSCH), have to be monitored for a potential DL reception. Thus, efficient DRX methods need to be defined to minimize battery consumption.

On the other hand, if the PDSCH data is not transmitted in the same subframe as the PDCCH containing the corresponding DL assignment, higher battery efficiency may be achieved, since it is known in advance whether a CC needs to be monitored or not for PDSCH. However, breaking the time relationship creates issues that need to be addressed. If a delay between the PDCCH DL assignment and the PDSCH reception is to be introduced, it is necessary for new procedures to be defined for the WTRU to determine how to find the PDSCH over a period of time.

SUMMARY

A method and apparatus are described for operating a wireless transmit/receive unit (WTRU) in a discontinuous reception (DRX) mode employing carrier aggregation. In one scenario, a physical downlink (DL) shared channel (PDSCH) is received on a DL component carrier (CC) of a particular serving cell during a cell-specific active time, whereby the DL CC is associated with an uplink (UL) CC. Then, a physical DL control channel (PDCCH) is monitored for DL assignments for the particular serving cell, and UL grants for the UL CC, during the cell-specific active time. In another scenario, a first subset of CCs is configured for PDCCH reception, and a second subset of the CCs is not configured for PDCCH reception. DRX is applied to at least one CC in the second subset based on a PDCCH active time of at least one of the CCs in the first subset.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment.

When referred to hereafter, the terminology "evolved Node-B (eNB)" includes but is not limited to a base station, a site controller, an access point (AP), or any other type of interfacing device capable of operating in a wireless environment.

When referred to hereafter, the terminology "DL CC" may include, but is not limited to, the DL of a "serving cell", a "primary serving cell (Peen)", or a "secondary serving cell (Stell)".

When referred to hereafter, the terminology "UL CC" may include, but is not limited to, the UL of a "serving cell", a "primary serving cell (Pcen)", or a "secondary serving cell (Stell)".

Figure 1:
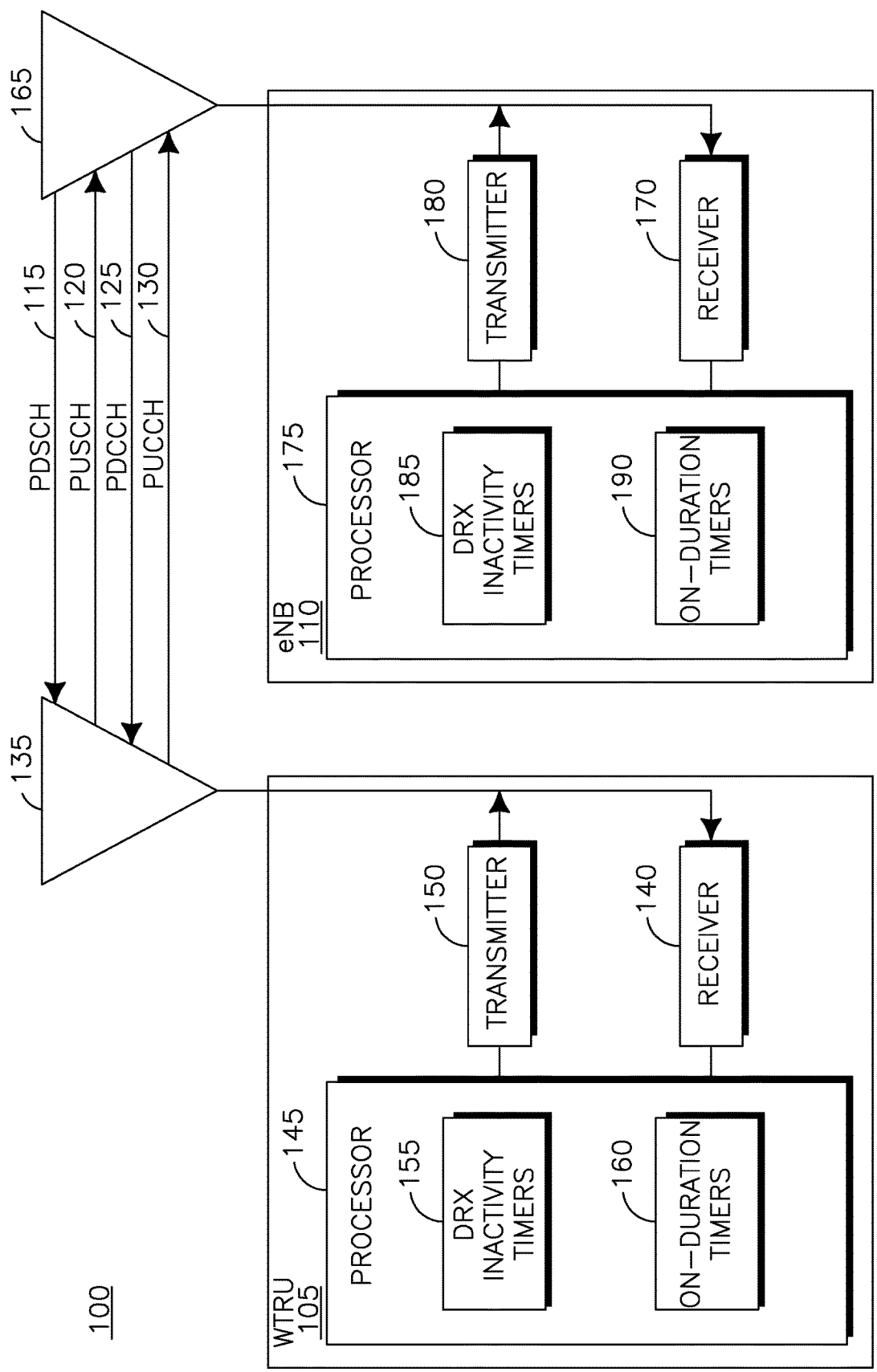
FIG. 1 shows a wireless communication system including a WTRU and an eNB.

FIG. 1 shows a wireless communication system 100 including a WTRU 105 and an eNB 110, which communicate via a PDSCH 115, a PUSCH 120, a PDCCH 125 and a physical UL control channel (PUCCH) 130. The WTRU 105 comprises an antenna 135, a receiver 140, a processor 145 and a transmitter 150. The processor 145 comprises a plurality of DRX inactivity timers 155 and a plurality of on-duration timers 160. The eNB 110 comprises an antenna 165, a receiver 170, a processor 175 and a transmitter 180. The processor 175 comprises a plurality of DRX inactivity timers 185 and a plurality of on-duration timers 190.

Figure 2:
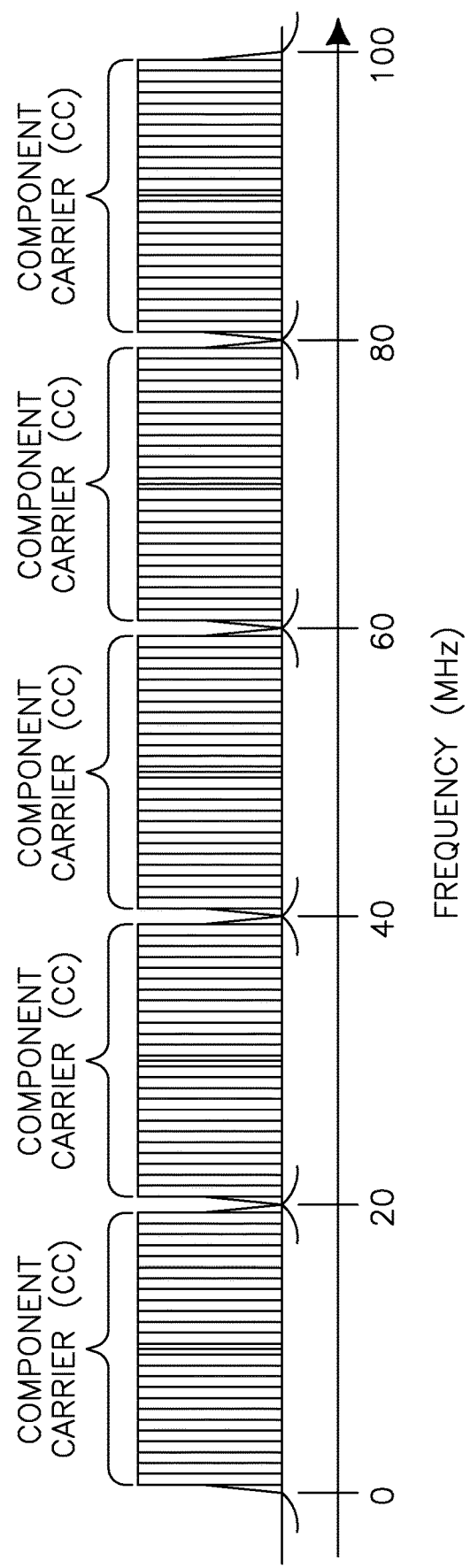
FIG. 2 shows an example of the contiguous intra-band carrier aggregation of a plurality of CCs.

FIG. 2 shows an example of the contiguous intra-band carrier aggregation of a plurality of CCs operating in respective 20 MHz bands.

Active Time defined on a Per-Carrier Basis

A method of operating in a DRX mode employing carrier aggregation is based on the concept of active time per CC. In this method, DRX operation is extended such that "PDCCH active time" is implemented when a WTRU monitors a PDCCH located on a DL CC, and "PDSCH active time" is implemented when the WTRU monitors a PDSCH located on a DL CC. The WTRU monitors assignments and/or grants for different CCs using at least one search space within a PDCCH, (i.e., specific resource blocks and symbols where PDCCH signaling exists for the WTRU).

A "serving cell" is comprised of a DL CC that may be associated with a UL CC. A "cell-specific active time" is defined for each serving cell, including a DL CC configured for PDSCH reception. During the cell-specific active time, the WTRU receives (or buffers) the PDSCH of the concerned serving cell for possible assignments received in the same subframe (i.e., TTI) of a radio frame for this serving cell, and monitors, in at least one search space specific to this serving cell, the PDCCH of at least one serving cell for assignments for the concerned serving cell, and grants for a UL CC (resource) configured to be associated to the concerned serving cell, if such a UL CC exists. The serving cell, for where the WTRU monitors the PDCCH for assignments to the concerned serving cell, may or may not be the same as the concerned serving cell.

Individual DL CCs may be configured to receive a PDCCH and/or a PDSCH transmissions. DRX for each active DL CC may be based on PDCCH active time, PDSCH active time, or a combination of both. DRX may be applied independently to each DL CC, and there is no requirement to synchronize DRX between CCs, although it is possible to force synchronization when beneficial.

PDCCH active time is defined for each DL CC that the WTRU is configured to receive a PDCCH. The PDCCH active time may include the PDSCH active time of each DL CC that may be assigned from the PDCCH of the DL CC. Each DL CC that may be scheduled has a PDSCH active time. Alternatively, the PDCCH active time may include PUSCH active time, which is a time when control information, pertaining to UL CC PUSCH operation from each DL CC, uses the DL CC for the reception of UL grants and hybrid automatic repeat request (HARQ) feedback. Such a UL CC will be referred to hereafter as an "anchored UL CC".

The PUSCH active time is defined for each UL CC that the WTRU is configured to transmit a PUSCH. The PUSCH active time may include:

a) The time while a scheduling request sent on a PUCCH of an anchored UL CC is pending;

b) The time while a UL grant for a pending HARQ retransmission may occur and there is data in the corresponding HARQ buffer for the UL-SCH of an anchored UL CC;

c) The time while a CC-specific DRX inactivity timer or other-CC DRX inactivity timer is running for an anchored UL CC;

d) Optionally, the time while a CC-specific on-duration timer is running for an anchored UL CC (note that such timer may not need to be defined for a UL CC);

e) Optionally (if not already included in a PDSCH active time), the time while a PDCCH indicating a new transmission addressed to the cell radio network temporary identifier (C-RNTI) of the WTRU has not been received after successful reception of a random access response for the explicitly signaled preamble; and f) Optionally, (if not already included in a PDSCH active time), the time while the MAC contention resolution timer is running.

The "PDSCH active time" is defined for each DL CC that the WTRU is configured to receive a PDSCH. The PDSCH active time may include:

1) The time while a CC-specific on-duration timer, DRX inactivity timer, other-CC DRX inactivity timer, DRX retransmission timer or a MAC contention resolution timer is running;

2) the time while a PDCCH (on same or different CC) indicating a new transmission addressed to the cell radio network temporary identifier (C-RNTI) of the WTRU has not been received after successful reception of a random access response for the explicitly signaled preamble; and 3) Optionally, the PDCCH active time of this same DL CC.

For DRX operation, "cell-specific active time" may include the time while a scheduling request (SR) sent on the PUCCH is pending. Cell-specific active time may pertain to a primary serving cell.

For DRX operation, cell-specific active time may include the time while a UL grant for pending HARQ retransmission may occur, and there is data in the corresponding HARQ buffer for the UL-SCH of the associated UL CC, if such CC is configured.

For DRX operation, cell-specific active time may include the time a PDCCH, indicating a new transmission addressed to the C-RNTI of the WTRU, has not been received after successful reception of a random access response for the preamble not selected by the WTRU. This time may be included for the cell-specific active time pertaining to the UL CC from which the preamble was transmitted, (e.g., associated to the primary serving cell).

For DRX operation, cell-specific active time may include the time an on-duration timer applicable to the concerned serving cell is running, a DRX inactivity timer applicable to the concerned serving cell is running, a DRX retransmission timer applicable to the concerned serving cell is running, or a MAC contention resolution timer is running. This time may be included for the cell-specific active time pertaining to a primary serving cell.

The following definitions of specific DRX inactivity timers and on-duration timers should apply:

1) DRX inactivity timer for a DL CC: Specifies the number of consecutive subframes during which the PDSCH of this CC, as well as the PDCCH of at least one other DL CC providing a DL assignment for this CC, may be monitored after this timer is triggered;

2) DRX inactivity timer for a UL CC: Specifies the number of consecutive subframes during which the PDCCH of at least one DL CC providing a UL grant for this CC may be monitored after this timer is triggered;

3) DRX inactivity timer for a serving cell: Specifies the number of consecutive subframes during which the cell-specific active time of this serving cell should be extended after this timer is triggered;

4) Other-CC DRX inactivity timer: Same definition as any of the DRX inactivity timers described above, except that this timer (if defined) may only be triggered by a DL assignment or UL grant (for a new transmission) for a different CC or serving cell;

5) On-duration timer for a DL CC: Specifies the number of consecutive subframes during which the PDSCH of this CC, as well as the PDCCH of DL CC(s) providing DL assignments for this CC, may be monitored at the beginning of a DRX cycle;

6) On-duration timer for a UL CC: Specifies the number of consecutive subframes during which the PDCCH of at least one DL CC providing a UL grant for this CC may be monitored at the beginning of a DRX cycle; and 7) On-duration timer for a serving cell: Specifies the minimum number of consecutive subframes during which the cell-specific active time of this serving cell should exist from the beginning of a DRX cycle.

The rules for starting and stopping the different timers mentioned above are implemented on a per-carrier basis. Thus, the configuration parameters short DRX cycle, long DRX cycle, DRX start offset, as well as the durations for the on-duration timer, DRX inactivity timer, DRX retransmission timer and DRX short cycle timer may be defined on a per-carrier (or per-serving cell) basis. It is also possible that some of these timers are shared (or are the same) between CCs or serving cells (for instance the on-duration timer may be shared for a set of CCs). However, the on-duration timer may not need to be defined for UL CCs. In this case, the associated parameters and timers (short DRX cycle, long DRX cycle, DRX start offset, DRX short cycle timer) may not be defined either, and the DRX retransmission timer and HARQ round trip time (RTT) timers may not need to be defined for UL CCs and UL HARQ processes respectively.

In addition, the CC-specific DRX inactivity timer may be handled in one or a combination of the following ways. It is noted that the terminology "triggered" used below may mean initially started or re-started at some later time.

A CC-specific DRX inactivity timer is triggered for a DL CC, when a new transmission is received on the PDSCH of this CC, and for a UL CC, when a new transmission is granted for the PUSCH of this CC.

A CC-specific DRX inactivity timer or other-CC DRX inactivity timer is triggered for a DL or UL CC, when a new transmission is received on the PDSCH (or granted for the PUSCH) of another DL (or UL) CC. A subset of DL or UL CCs that have this property may be pre-signaled by higher layers.

A CC-specific DRX inactivity timer or other-CC DRX inactivity timer is triggered for a UL CC, a DL assignment or a UL grant (for any transmission or for a new transmission only) for any CC that is indicated from the PDCCH on the same DL CC that provides grants and HARQ feedback for this UL CC.

A CC-specific DRX inactivity timer or other-CC DRX inactivity timer is triggered for a DL CC, a DL assignment or a UL grant (for any transmission or for a new transmission only) for any CC that is indicated from the PDCCH on the same DL CC that provides DL assignments for this CC.

It is possible to implement a single DRX inactivity timer or single other-CC DRX inactivity timer (respectively) per set of CCs using the same DL CC for PDCCH.

A CC-specific DRX inactivity timer is triggered for a CC (UL only, DL only, or both UL and DL) when a DL assignment or a UL grant (for any transmission or for a new transmission only) for any CC is indicated from the PDCCH on any DL CC. It is possible to implement a single DRX inactivity timer or single other-CC DRX inactivity timer (respectively) for all CCs. A subset of DL or UL CCs that have this property may be signaled by higher layers.

An other-CC DRX inactivity timer is triggered for a UL CC, a DL assignment or a UL grant (for any transmission or for a new transmission only) for any other CC that is indicated from the PDCCH on the same DL CC that provides grants and HARQ feedback for this UL CC. A subset of DL or UL CCs that have this property may be signaled by higher layers.

An other-CC DRX inactivity timer is triggered for a DL CC, a DL assignment or a UL grant (for any transmission or for a new transmission only) for any other CC that is indicated from the PDCCH on the same DL CC that provides DL assignments for this CC. It is possible to implement a single DRX inactivity timer or a single other-CC DRX inactivity timer (respectively) per set of CCs using the same DL CC for PDCCH. A subset of DL or UL CCs that have this property may be signaled by higher layers.

An other-CC DRX inactivity timer is triggered for a CC (UL only, DL only, or both UL and DL) when a DL assignment or a UL grant (for any transmission or for a new transmission only) for any other CC is indicated from the PDCCH on any DL CC.

A CC-specific DRX inactivity timer or other-CC DRX inactivity timer is triggered for a DL or UL CC when a new transmission is received on the PDSCH (or granted for the PUSCH) of another DL (or UL) CC, with the additional condition that the on-duration timer for that other CC is running. A subset of DL or UL CCs that have this property may be pre-signaled by higher layers.

An other-CC DRX inactivity timer is triggered for a CC (UL only, DL only, or both UL and DL) when a DL assignment or a UL grant (for any transmission or for a new transmission only) for any other CC is indicated from the PDCCH on any DL CC, with the additional condition that the on-duration timer for that DL CC is running. A subset of DL CCs that have this property may be pre-signaled by higher layers.

A serving cell-specific DRX inactivity timer is triggered when a new transmission is received on the PDSCH, or a new transmission is granted for the PUSCH for this serving cell.

A serving cell-specific DRX inactivity timer or other-CC DRX inactivity timer is triggered when a new transmission is received on the PDSCH, or a new transmission is granted for PUSCH for a different serving cell. A subset of serving cells that have this property may be configured by higher layers.

An other-CC DRX inactivity timer is triggered when a new transmission is received on the PDSCH, or a new transmission is granted for PUSCH for a different serving cell. A subset of serving cells that have this property may be configured by higher layers.

It is possible to implement a single DRX inactivity timer or a single other-CC DRX inactivity timer (respectively) for all CCs.

In any case described above that includes the starting or re-starting of the DRX inactivity timer or other-CC DRX inactivity timer, a delay of a few subframes may be required between the triggering event and the actual start or re-start of the DRX inactivity timer or other-CC DRX inactivity timer. This allows some wake-up time for activating the reception on the concerned CC.

DRX timers (cycles, on duration, inactivity, retransmission) may be optimized for traffic requirements on each DL and/or UL CC they are configured for. Each individual UL or DL CC not carrying PDCCH may be configured so that the required reception periods (PDSCH or PUSCH active times) are included in a subset of the combined reception periods (PDCCH active time) on the associated CC carrying a PDCCH.

Furthermore, the following rules may apply regarding the transmission of channel quality indicator (CQI)/precoding matrix index (PMI)/rank indicator (RI) and sounding reference symbol (SRS), whereby CQI/PMI/RI pertaining to the DL-SCH of a CC is not reported when this CC is not in PDSCH active time, or when the corresponding serving cell is not in cell-specific active time, and SRS pertaining to the UL-SCH of a UL CC is not reported when this CC is not in PUSCH active time, or when the corresponding serving cell is not in cell-specific active time.

Active Time Defined on a Per-Carrier with PDCCH Basis

Alternatively, there may be just PDCCH active time defined for each DL CC that has PDCCH configured. The short DRX cycle, long DRX cycle, and the DRX start offset parameters, as well as the durations for the on-duration-Timer, DRX inactivity timer, DRX retransmission timer, and DRX short cycle timer are defined just for DL CCs that are configured for PDCCH reception. The rules for starting and stopping these timers may be similar to the previously known conventional rules, except that there is an independent PDCCH active time for each DL CC configured for PDCCH reception. In addition, conventional triggering rules pertaining to UL transmissions may now be applied, for each DL CC configured for PDCCH reception, only to those UL transmissions on UL CC that are receiving grants and HARQ feedback from this DL CC.

Other DL CCs without PDCCH that may have PDSCH transmissions assigned from a particular CC carrying PDCCH may apply the same DRX defined by the PDCCH active time of this CC carrying PDCCH. This solution avoids the need to maintain DRX timers on each DL CC without PDCCH and on each UL CC, but eliminates the possibility to optimize DRX timers for each CC.

In the case there are several CCs configured to receive a PDCCH that may provide DL assignments for a CC which does not have PDCCH, the DRX for this CC is the sum of PDCCH active times of the CCs which have PDCCH and may provide PDSCH assignments for this CC. Alternatively, the PDCCH active time of one "primary" CC out of the several CCs configured to receive a PDCCH that may provide DL assignments for a given CC, may be selected to define the PDSCH active time for this CC.

Active Time Defined on a Per-Carrier with PDCCH and Delayed DL SCH Reception

PDSCH transmissions are currently not delayed relative to PDCCH assignment of this transmission. Therefore when PDCCH on one CC (CC #x) may allocate PDSCH for another CC (CC #y), reception on the other CC (CC #y) may be enabled even when there is no assignment on this CC (CC #y) since the reception of the PDSCH and common reference symbols on the other CC (CC #x) may start before the PDCCH is completely received on one CC (CC #x). To allow CC with only PDSCH reception configured to wake up only when the corresponding PDCCH assignment was received on another CC, PDSCH transmission may be delayed relative to PDCCH to allow for activation of PDSCH CC reception and PDCCH processing time.

Alternative, PDSCH transmissions may be delayed k subframes from PDCCH assignment when PDSCH transmission occurs on a CC that is different from the CC the PDCCH assignment was received on. Furthermore, all PDSCH transmissions may be delayed relative to a PDCCH assignment, regardless of which DL CC is assigned for an R10 WTRU.

With either of these approaches, DRX on CCs that do not have PDCCH configured do not require DRX active time defined by existing DRX timers, (e.g., DRX cycle, on-duration, inactivity, retransmission timers). The WTRU is not required to always receive on a CC without PDCCH during PDCCH active time on other CCs.

DRX on CCs without PDCCH may be governed by the PDCCH assignments received for this WTRU on other CCs. Reception is only enabled when a PDCCH assignment has been received.

Since PDSCH transmission is delayed by k subframes, UL HARQ feedback is also delayed by k subframes. Relative to PDCCH assignment HARQ feedback will be received at k+4 subframes. This potentially results in feedback collision between assignments with delayed PDSCH and feedback across CCs, and non-delayed PDSCH and feedback when a PDCCH and a PDSCH are on the same CC. There are several potential solutions, including delay PDSCH and feedback even when on same CC, or aggregate feedback with the same mechanism used for more DL CCs than UL CCs.

Due to the delayed DSCH transmission additional DL HARQ processes will be required. Currently there is an eight (8) subframe HARQ process RTT. With the k subframe delayed DSCH, the DL HARQ RTT may be increased by k subframes. In order to allow for continuous PDSCH transmission, additional HARQ processes may be required.

One alternative to increasing the DL HARQ RTT and number of DL HARQ processes may be to reduce the PDCCH and/or PDSCH processing time. For example if k=2 with PDCCH processing reduced to 2 subframes and enabling reception PDSCH reception across CCs reduced to 2 subframes the existing HARQ RTT and number of HARQ processes may be maintained.

Another consideration is UL feedback collisions in the time domain between WTRUs. A R8 WTRU without delay is scheduled k subframes after a release 10 WTRU with delay. Several solutions may be considered for this conflict including UL CCs are assigned either to further delayed feedback or not. All WTRUs configured on a given UL CC will either have further delayed feedback or not. Alternatively, a smart eNB scheduler may minimize the switching points between further delayed feedback and not further delayed feedback. When switching between feedback latencies occurs, the scheduler may enforce scheduling gaps to avoid feedback collision.

Alternatively, subframe time boundary of CCs without PDCCH allocation (CC #y) may be shifted in time, such as the reception of the PDSCH and the common reference symbols may start after the PDCCH reception on the other CC (CC #x) is completed (up to symbol #3) and processed. For example, symbol #0 of CCs without PDCCH allocation may be transmitted at the same as symbol #8 of CCs with PDCCH. This may allow the WTRU to process the PDCCH in 4 symbols or $4/14$ of a subframe. With this approach, the requirement in terms of PDSCH processing time to send the UL HARQ feedback may not be impacted significantly relative to R8, (i.e., the processing time may be reduced by only $5/14$ of a subframe).

Referring again to FIG. 1, the processor 145 in the WTRU 105 comprises at least one DRX inactivity timer 155 and at least one on-duration timer 160. The WTRU 105 operates in a DRX mode employing carrier aggregation, receives DL transmissions or transmits UL transmissions, during an active time, on a CC that is not configured for PDCCH reception, monitors a PDSCH for shared channel dynamic allocations including a DL assignment or a UL grant, and applies DRX to the CC based on PDSCH active time or PUSCH active time.

Alternatively, the processor 145 in the WTRU 105 operates in a DRX mode employing carrier aggregation, receives DL transmissions or transmits UL transmissions, during an active time, on a plurality of CCs where a first subset of the CCs are configured for PDCCH reception and a second subset of the CCs are not configured for PDCCH reception, and applies DRX to at least one CC in the second subset based on a PDCCH active time of at least one of the CCs in the first subset.

Figure 3:
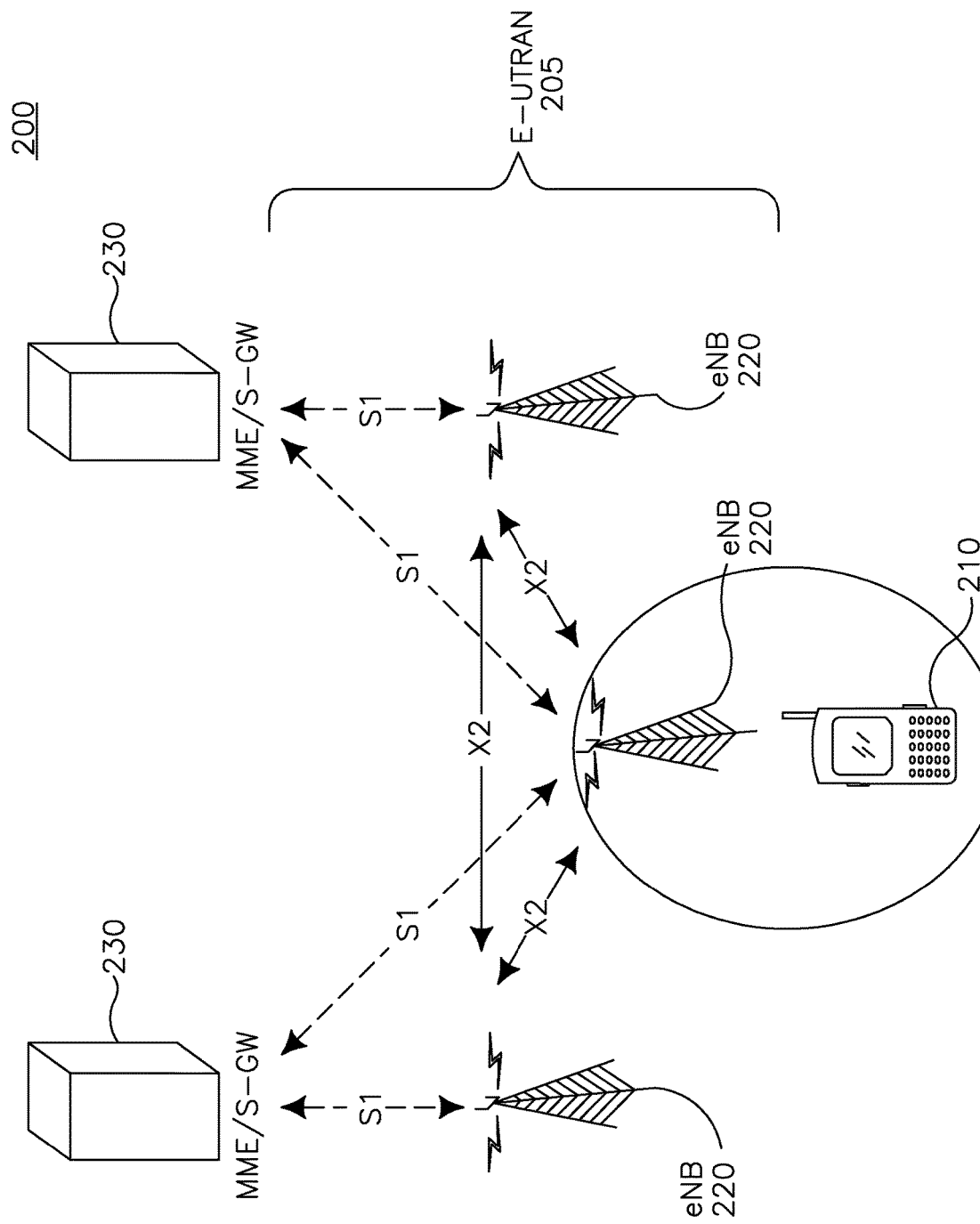
FIG. 3 shows a wireless communication system including a WTRU and an eNB.

FIG. 3 shows an LTE wireless communication system/access network 200 that includes an evolved-universal terrestrial radio access network (E-UTRAN) 205. The E-UTRAN 205 includes several eNBs 220. A WTRU 210 is in communication with an eNB 220. The eNBs 220 interface with each other using an X2 interface. Each of the eNBs 220 interface with a mobility management entity (MME)/serving gateway (S-GW) 230 through an Si interface. Although a single WTRU 210 and three eNBs 220 are shown in FIG. 3, it should be apparent that any combination of wireless and wired devices may be included in the wireless communication system access network 200.

Figure 4:
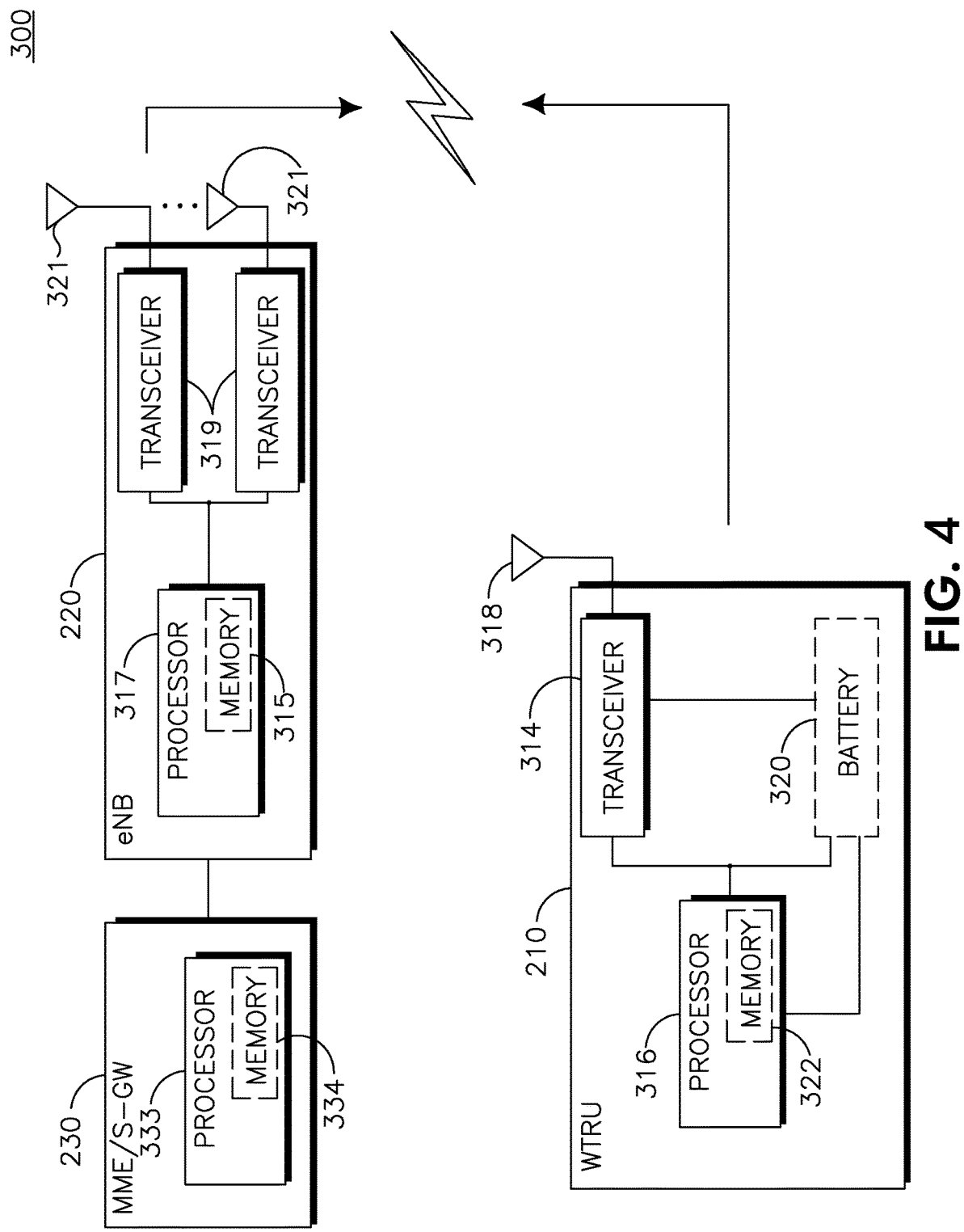
FIG. 4 shows the wireless communication system of FIG. 3 in additional detail.

FIG. 4 is an exemplary block diagram of an LTE wireless communication system 300 including the WTRU 210, the eNB 220, and the MME/S-GW 230. As shown in FIG. 4, the WTRU 210, the eNB 220 and the MME/S-GW 230 are configured to perform DRX based on per carrier active time as described above.

In addition to the components that may be found in a typical WTRU, the WTRU 210 includes a processor 316 with an optional linked memory 322, at least one transceiver 314, an optional battery 320, and an antenna 318. The processor 316 is configured to perform DRX based on per carrier active time as disclosed above. The transceiver 314 is in communication with the processor 316 and the antenna 318 to facilitate the transmission and reception of wireless communications. In case a battery 320 is used in the WTRU 210, it powers the transceiver 314 and the processor 316.

The WTRU 210 is configured to perform a DRX operation. The transceiver 314 is configured to monitor a DL CC for the reception of a PDCCH, and the processor 316 is configured to determine a PDCCH active time for each DL CC that the WTRU 210 is configured to receive the PDCCH. The transceiver 314 may also be configured to monitor a DL CC for the reception of a PDSCH, and the processor 316 is configured to determine a PDSCH active time for each DL CC that the WTRU 210 is configured to receive the PDSCH.

In addition to the components that may be found in a typical eNB, the eNB 220 includes a processor 317 with an optional linked memory 315, transceivers 319, and antennas 321. The processor 317 is configured to perform a method of DRX based on per carrier active time as disclosed above. The transceivers 319 are in communication with the processor 317 and antennas 321 to facilitate the transmission and reception of wireless communications. The eNB 220 is connected to the MME/S-GW 230, which includes a processor 333 with an optional linked memory 334.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
   a processor operatively coupled to a transceiver, the processor and transceiver configured to receive frequency band configuration information, wherein the frequency band configuration information indicates a plurality of frequency bands;
   the processor and transceiver configured to receive a physical downlink control channel (PDCCH) transmission in a first frequency band out of the plurality of frequency bands; wherein the PDCCH transmission includes control information, wherein the control information is related to receiving and submitting feedback for a physical downlink shared channel (PDSCH) transmission,
      wherein the control information includes a downlink assignment that indicates a first time interval offset relative to the PDCCH transmission and subcarriers of a second frequency band out of the plurality of frequency bands,
      wherein the control information further includes an uplink grant for HARQ feedback that indicates a second time interval offset relative to the PDSCH transmission;
   the processor and transceiver, based on the downlink assignment indicated in the control information on the PDCCH transmission in the first frequency band, configured to receive the PDSCH transmission on the assigned subcarriers at the indicated first time interval, wherein the indicated first time interval is offset from a symbol of the PDCCH transmission by a plurality of symbols; and the processor and the transceiver configured to transmit the HARQ feedback based on the uplink grant, wherein the HARQ feedback is time offset from the PDCCH transmission due to at least a combination of the first time interval offset and the second time interval offset.

2. The WTRU of claim 1 wherein:

the processor and transceiver further configured to receive discontinuous reception (DRX) configuration information; and the processor and transceiver, in response to the received DRX configuration information, are further configured to receive the PDCCH during an active time derived from the received DRX configuration information.

3. The WTRU of claim 2 wherein the active time is derived using a single DRX activity timer for the plurality of frequency bands.

4. A method implemented by a wireless transmit/receive unit (WTRU), the method comprising:

receiving frequency band configuration information, wherein the frequency band configuration information indicates a plurality of frequency bands;

receiving a physical downlink control channel (PDCCH) transmission in a first frequency band out of the plurality of frequency bands, wherein the PDCCH includes control information, wherein the control information is related to receiving and submitting feedback for a physical downlink shared channel (PDSCH) transmission, wherein the control information includes a downlink assignment that indicates a first time interval offset relative to the PDCCH transmission and subcarriers of a second frequency band out of the plurality of frequency bands, wherein the control information further includes an uplink grant for HARQ feedback that indicates a second time interval offset relative to the PDSCH transmission;

based on the downlink assignment indicated in the control information on the PDCCH transmission in the first frequency band, receiving the PDSCH transmission on the assigned subcarriers at the indicated first time interval, wherein the indicated first time interval is offset from a symbol of the PDCCH transmission by a plurality of symbols; and transmitting the HARQ feedback based on the uplink grant, wherein the HARQ feedback is time offset from the PDCCH transmission due to at least a combination of the first time interval offset and the second time interval offset.

5. The method of claim 4 wherein:

receiving, by the WTRU, discontinuous reception (DRX) configuration information; and in response to the received DRX configuration information, monitoring PDCCH during an active time derived from the received DRX configuration information.

6. The method of claim 5 wherein the active time is derived using a single DRX activity timer for the plurality of frequency bands.

7. A base station comprising:

a processor operatively coupled to a transceiver, the processor and transceiver configured to transmit frequency band configuration information to a wireless transmit/receive unit (WTRU), wherein the frequency band configuration information indicates a plurality of frequency bands;

the processor and transceiver configured to transmit a physical downlink control channel (PDCCH) transmission in a first frequency band out of the plurality of frequency bands to the WTRU;

wherein the PDCCH transmission includes control information, wherein the control information is related to feedback for a physical downlink shared channel (PDSCH) transmission, wherein the control information includes a downlink assignment that indicates a first time interval offset relative to the PDCCH transmission and subcarriers of a second frequency band out of the plurality of frequency bands, wherein the control information further includes an uplink grant for HARQ feedback that indicates a second time interval offset relative to the PDSCH transmission;

the processor and the transceiver configured to transmit the PDSCH transmission to the WTRU on the assigned subcarriers on the second frequency band, wherein the indicated first time interval is offset from a symbol of the PDCCH transmission by a plurality of symbols; and the processor and the transceiver configured to receive the HARQ feedback at the uplink grant, wherein the HARQ feedback is time offset from the PDCCH transmission due to at least a combination of the first time interval offset and the second time interval offset.

8. The base station of claim 7 wherein:

the processor and the transceiver are further configured to transmit to the WTRU discontinuous reception (DRX) configuration information, wherein the DRX configuration information is used by the WTRU to determine an active time to monitor for a PDCCH transmission.

9. The base station of claim 8 wherein the active time is derived using a single DRX activity timer from the DRX configuration information for the plurality of frequency bands.

* * * * *